July 31, 1962   E. V. HARDWAY. JR   3,047,784
SUPPLY VOLTAGE VARIATION COMPENSATED SERVOSYSTEM
Original Filed Nov. 30, 1959
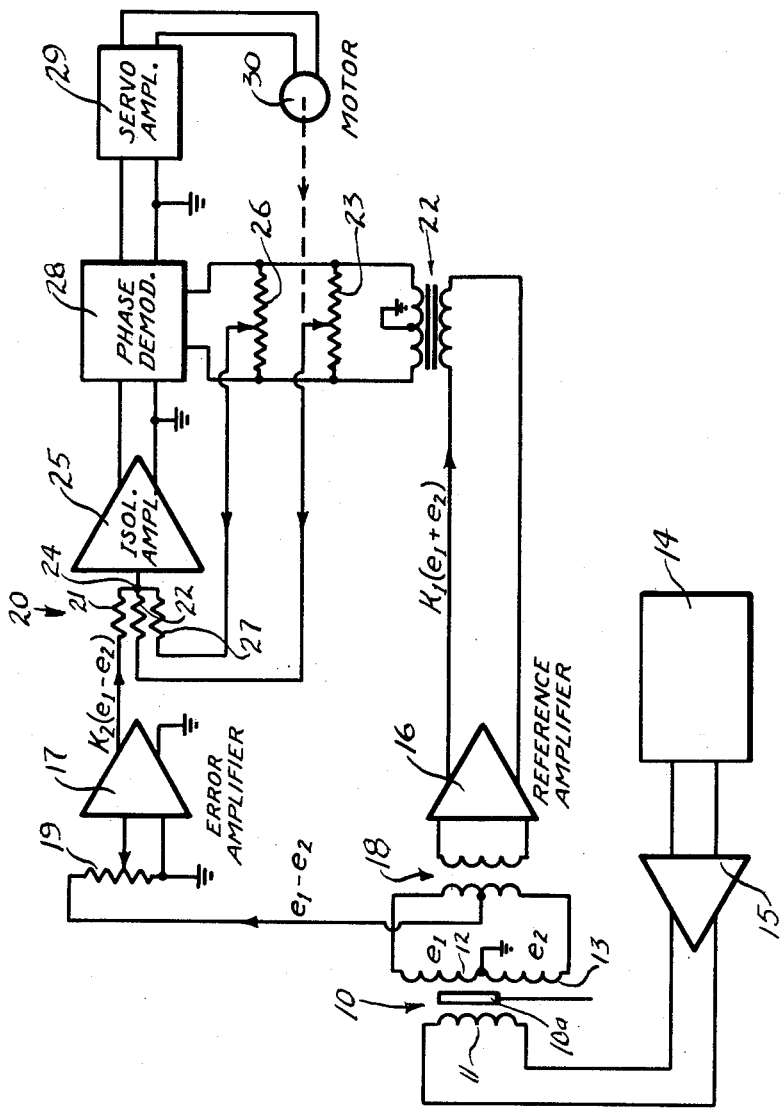
Edward V. Hardway, Jr.
INVENTOR.
BY Browning, Simms, Hyer
& Eickenroht
ATTORNEYS

United States Patent Office 3,047,784
Patented July 31, 1962

3,047,784
SUPPLY VOLTAGE VARIATION COMPENSATED SERVOSYSTEM
Edward V. Hardway, Jr., Houston, Tex., assignor to Houston Instrument Corporation, Houston, Tex.
Continuation of application Ser. No. 856,075, Nov. 30, 1959. This application Feb. 2, 1961, Ser. No. 87,054
4 Claims. (Cl. 318—28)

This invention relates to improvements in a differential transformer type of circuit for measuring displacements.

It has been known to employ a differential transformer to measure physical displacements of a sensing device. Thus, the sensing device is connected to the movable core of the transformer and the resulting relative changes in the voltages or currents of the transformer secondaries are measured to provide an output which is a function of the displacement of the core. Heretofore, many of the differential transformer circuits used for this purpose have been designed so as to employ a highly stabilized voltage or current regulated source for the primary of the transformer. Measurement accuracy has been dependent on the degree of regulation of the source for the primary and also upon temperature drift effects of the coil windings. These factors have allowed, at best, accuracies of no better than one percent. Even this accuracy cannot be obtained throughout a broad range due to the non-linearity of the transformer.

It is accordingly one object of this invention to provide a measuring circuit of the differential transformer type in which temperature drift effects, non-linearity and the like are compensated for in the read-out circuit connected to the transformer.

Another object is to provide a differential transformer type measuring circuit which does not necessarily require a highly regulated input to the primaries.

Another object of this invention is to provide such a circuit in which any non-linearity of the transformer is compensated for by employing a ratio of signals from the transformer such that non-linearity of one signal is compensated by a corresponding non-linearity of the other signal.

In the drawing, which schematically illustrates a preferred embodiment of the invention, a differential transformer 10 is shown as comprising the usual primary 11 and a pair of secondaries 12 and 13 connected in opposition with each other and grounded at their common juncture. The input to the primary 11 can be derived from any suitable source which need not necessarily be closely regulated. In the preferred embodiment, the source 14 is of relatively low frequency, which may be 400 cycles per second and preferably is controlled by a tuning fork. The output of the source can be amplified by voltage amplifier 15 which in turn is connected to the primary.

As shown in the drawing, a reference amplifier 16 and an error amplifier 17 are connected to the differential transformer in such a manner that the input to the reference amplifier is the sum of the voltages ($e_1$ and $e_2$) of the transformer secondaries and the input to the error amplifier is the difference in these voltages. Thus, a transformer 18 is connected across the secondaries 12 and 13 to give the voltage sum while the input to the error amplifier is derived from center tapping transformer 18 and develops the input signal across resistance 19. Resistance 19 can comprise a potentiometer so that by adjusting the level of the voltage input to amplifier 17, the mechanical magnification of the system can be changed.

It will be noted that any variances in voltages, current or phase caused by variations at the source or in primary impedance are inherently combined in both signals which are respectively the inputs to the two amplifiers. Reference amplifier 16 is preferably a stable low gain amplifier, while the error amplifier 17 is a relatively high gain amplifier.

A summing circuit 20 is connected to the amplifier outputs in order to compare the amplified reference and error voltages. Thus, the error amplifier output can be fed to resistance 21 and the reference amplifier output to resistance 22. These outputs should be in phase opposition and this can be accomplished in numerous ways such as by employing an isolation transformer 22 to couple the reference amplifier to resistor 22.

Means are provided for varying one of the error and reference voltages responsive to a departure from a predetermined relationship between the two voltages so as to maintain the voltages in such relationship. While any number of suitable means can be employed, the illustrated one comprises a potentiometer 23 connected across the output of the reference amplifier.

It will thus be seen that a portion of the reference voltage is taken from a potentiometer and added in reverse phase to the error voltage at a summing junction 24 which is located at the input to isolation amplifier 25. Whatever the ratio of error voltage to reference voltage, a setting of the potentiometer 23 will exist (within limits) at which their sum will be zero. Since the differential transformer errors have been carried through both loops in varied ratios, their net effect at the summing point is zero. In this connection, the relative gain of the two amplifiers 16 and 17 should be such as to give the desired range of adjustment of potentiometer 23.

At this point, it should be noted that large movements of the core 10a of the differential transformer will result in non-linear outputs; that is, the error voltage will be non-linear as will the reference voltage. In the circuit shown, a departure of the error voltage from linearity is offset by a corresponding departure of the reference voltage in an opposite sense. For example, a non-proportional decrease in the error signal is matched with a corresponding reduction in the reference signal so as to decrease the error due to non-linear operation of the transformer.

A zero control voltage can be derived from a potentiometer 26 connected across the output of the reference amplifier and this voltage can be fed to summing junction 24 via resistance 27.

From the summing junction, the magnitude of the inequality of the reference and error voltages and zero control voltage are sensed by a phase demodulator 24 and fed as a D.-C. signal to a servo amplifier 29. A servo motor 30 drives the pick-off contact of potentiometer 23 to a position such that the sum of the error and reference voltages at the summing junction will be zero; that is, potentiometer 23 is driven back to null. Therefore, the position of the pick-off for potentiometer 23 is a function of the position of core 10a. The servo motor can be connected, therefore, to an indicator or a recorder which will then record the movements and positions of the movable core 10a.

It will be apparent that two such circuits as here described can be combined as an X–Y plotter to obtain and record physical displacements substantially independently of fluctuations in the output of the current source for the differential transformer primary, non-linearity of the differential transformer, temperature drift effects of the core winding and other variables tending to cause variations in the differential transformer output other than those due to core movement.

This application is a continuation of my co-pending application Serial Number 856,075, filed November 30, 1959.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. In an apparatus for measuring variations in electrical unbalance of the secondaries of a differential transformer, a reference and an error amplifier having their respective inputs connected to said transformer secondaries such that the input to the reference amplifier is the sum of the voltages across the transformer secondaries and the input to the error amplifier is the voltage difference between the transformer secondaries, a summing circuit connected to the outputs of the reference and the error amplifiers to compare the amplified reference and error voltages, and means for varying one of said voltages responsive to a departure from a predetermined relationship between the two voltages so as to maintain said voltages in said predetermined relationship.

2. In an apparatus for determining the position of a core in a differential transformer, means connectable to the secondaries of said transformer to provide a first output which is a function of the sum of the voltages across said secondaries and a second output which is a function of the difference of the voltages across said secondaries, and means for comparing said first and second outputs and for varying at least one of them responsive to a departure from a predetermined relationship between the two outputs so as to maintain said first and second outputs in said predetermined relationship.

3. In an apparatus for determining the core position of a differential transformer, a potentiometric rebalance servomechanism having a rebalance potentiometer connected to the transformer so that the voltage applied to the potentiometer is a function of the sum of the voltages across said transformer secondaries and means for comparing the potentiometer output voltage with the difference of the voltage across said transformer secondaries and for driving the said rebalance potentiometer in response to a departure from a predetermined relationship between the potentiometer output voltage and said difference voltage.

4. In an apparatus for determining the core position of a differential transformer, means connected to the secondaries of said transformer to compare the sum of the voltages across said secondaries with the difference between the voltages across said secondaries, and servomechanism means for varying at least one of said sum and difference voltages responsive to a departure from a predetermined relationship between such voltages so as to maintain said voltages in said predetermined relationship.

No references cited.